United States Patent
Li et al.

(10) Patent No.: US 11,580,128 B2
(45) Date of Patent: Feb. 14, 2023

(54) PREVENTING DBMS DEADLOCK BY ELIMINATING SHARED LOCKING

(71) Applicant: INTERNATIONAL BUSINESS MACHINES CORPORATION, Armonk, NY (US)

(72) Inventors: Shuo Li, Beijing (CN); Xiaobo Wang, Beijing (CN); ShengYan Sun, Beijing (CN); Hong Mei Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 396 days.

(21) Appl. No.: 16/876,391

(22) Filed: May 18, 2020

(65) Prior Publication Data

US 2021/0357419 A1 Nov. 18, 2021

(51) Int. Cl.
*G06F 16/25* (2019.01)
*G06F 16/22* (2019.01)
*G06F 16/23* (2019.01)
*G06F 16/901* (2019.01)
*G06F 16/17* (2019.01)
*G06F 16/16* (2019.01)
*G06F 16/18* (2019.01)

(52) U.S. Cl.
CPC ............ *G06F 16/25* (2019.01); *G06F 16/162* (2019.01); *G06F 16/1734* (2019.01); *G06F 16/1865* (2019.01); *G06F 16/2246* (2019.01); *G06F 16/23* (2019.01); *G06F 16/9024* (2019.01)

(58) Field of Classification Search
CPC .... G06F 16/25; G06F 16/162; G06F 16/1734; G06F 16/1865; G06F 16/2246; G06F 16/23; G06F 16/9024; G06F 16/2343

USPC ........ 707/648, 649, 682, 703, 704, 797, 803
See application file for complete search history.

(56) References Cited

U.S. PATENT DOCUMENTS

| | | | |
|---|---|---|---|
| 8,019,768 B1 | 9/2011 | Steigerwald | |
| 10,671,639 B1 * | 6/2020 | Acheson | G06F 16/273 |
| 11,157,517 B2 * | 10/2021 | Mandadi | G06F 16/1873 |
| 2007/0282759 A1 * | 12/2007 | Devries | G06Q 40/06 705/36 R |
| 2009/0248724 A1 | 10/2009 | Bhattacharjee | |

(Continued)

OTHER PUBLICATIONS

Mell, Peter et al.; "The NIST Definition of Cloud Computing;" National Institute of Standards and Technology; Special Publication 800-145; Sep. 2011; 7 pages.

*Primary Examiner* — Phong H Nguyen
(74) *Attorney, Agent, or Firm* — Schmeiser, Olsen & Watts, LLP; Stephanie Carusillo

(57) ABSTRACT

A DBMS receives a database-access request that includes an instruction to non-destructively read a database table row. The DBMS assigns the request a TSN identifier and creates a TSN image that identifies all TSNs assigned to transactions that are not yet committed. The DBMS traverses a linked list of log entries that identifies a chronological history of transactions performed on the same row. The DBMS infers that the table row currently contains data stored by the most recently logged transaction that is not contained in the TSN image and that has thus been committed. The DBMS then continues to process statements of the transaction based on the assumption that the row contains the inferred value. The DBMS performs this procedure without acquiring a shared lock on the data page or on the index leaf page that points to the table row.

20 Claims, 8 Drawing Sheets

(56) References Cited

U.S. PATENT DOCUMENTS

| | | | |
|---|---|---|---|
| 2013/0036136 A1* | 2/2013 | Horii | G06F 16/2308 |
| | | | 707/E17.014 |
| 2015/0277794 A1* | 10/2015 | Tudor | G06F 3/0619 |
| | | | 711/103 |
| 2017/0116264 A1 | 4/2017 | Baggett | |
| 2017/0300552 A1* | 10/2017 | Mandadi | G06F 16/9024 |
| 2017/0316042 A1 | 11/2017 | She | |
| 2020/0293550 A1* | 9/2020 | Acheson | G06F 16/273 |

* cited by examiner

PREVENTING DBMS DEADLOCK BY ELIMINATING SHARED LOCKING

BACKGROUND

The present invention relates in general to database management system (DBMS) applications and technology and in particular to improved methods of accessing database index pages and data pages.

A DBMS locates values stored in a database table by referring to a tree-structured index that contains a linked list of index leaf pages. Each entry in a leaf page points to a row of a database table that contains a particular stored value. Leaf pages, and entries within any particular leaf page, are organized sequentially in order of the stored values to which the entries point. When the number of entries in a leaf page approaches that page's maximum capacity, the DBMS splits the page into two pages and assigns each of the two pages a sub-range of the original page's range of values.

While performing a transaction on a row of a database table, a DBMS may temporarily lock the data page that contains the table row and the index leaf page that points to that row. These locks persist until the transaction's database-access operation is "committed" or made permanent in the actual database. A Structured Query Language (SQL) statement, contained in a transaction, is deemed to have been committed when the DBMS has completed any inserting, deleting, updating, or other actions specified by the statement, such that the changes have permanently altered the contents of the database and have become visible to all users. In relational databases accessed by means of SQL-formatted queries, statements contained in a transaction can be deemed to have been committed when the DBMS performs an SQL COMMIT statement that follows those statements in a database query. Locking a database data page that contains a particular database row while an SQL statement revises the contents of that row prevents multiple transactions from attempting to simultaneously revise the same index or data page or read the page while it is still in the process of being revised by another transaction.

A lock may be either an exclusive lock (or "X-lock"), which prevents other transactions from accessing the locked page in any way, or a shared lock ("S-lock") that allows other transactions to read but not revise the locked page. Only one transaction may concurrently acquire an X-lock on a database resource, but multiple users can place concurrent S-locks on the same page.

In a typical DBMS application, an SQL query that seeks to read a database record would acquire an S-lock on the data page that contains the record and the index leaf page that points to that record, in order to ensure that no other transaction revises or deletes the record during the read operation. The query might also acquire an S-Lock on the next or previous page to temporarily prevent another transaction from performing an operation that would split an adjacent index page or change a pointer in the linked list that allows the DBMS to locate the accessed page.

When a query seeks to merely read a database record, there is no reason to prevent other transactions from concurrently reading the same database row or other type of record, the index leaf page that points to the record, or any data page or index leaf page that links to or is pointed to by the accessed data page or leaf page. However, a query that attempts to update or delete an existing database record or insert a new record must acquire an X-lock on the record until that operation is committed. If the operation will result in revision to a pointer or link in a database or the index leaf page adjacent to the accessed page, those adjacent pages must also be X-locked. This mechanism prevents other transactions from attempting to read or alter the same table row at the same time.

SUMMARY

Embodiments of the present invention comprise systems, methods, and computer program products for preventing database deadlock caused by attempts by two transactions to lock the same index leaf page or database data page. A DBMS receives a database-access request that contains an instruction to non-destructively read a database table row, such as an SQL SELECT statement. The DBMS assigns the received request a Transaction Serial Number (TSN) identifier and creates a TSN image that identifies all TSNs that have been assigned to transactions that have not yet been fully committed by the DBMS. The DBMS traverses a linked list of log entries that identifies a chronological history of transactions performed on the table row. The DBMS infers that the table row currently contains data stored by the most recently logged transaction that has been committed by determining which logged transactions are not identified by a TSN contained in the TSN image. The DBMS also determines whether a Split Page Sequential Number (SPSN) previously assigned to the index leaf page still matches the originally assigned SPSN value. If the SPSN has changed, the DBMS assumes that the index leaf page has been split at some point since the initial assignment and traverses the DBMS's index tree to identify which leaf pages currently point to key values that identify rows of the data table. The DBMS then, assuming that the row currently contains the inferred value, performs each statement of the transaction. The DBMS performs this procedure without requiring the acquisition of a shared lock on either the data page that contains the table row or on any index leaf page that currently or in the past has pointed to the table row.

BRIEF DESCRIPTION OF THE DRAWINGS

FIG. 7A shows the state of a DBMS index tree prior to a performance of an index-split operation by the DBMS. FIG. 7B shows the state of the index tree after the DBMS completes the split operation.

DETAILED DESCRIPTION

Figure 1:
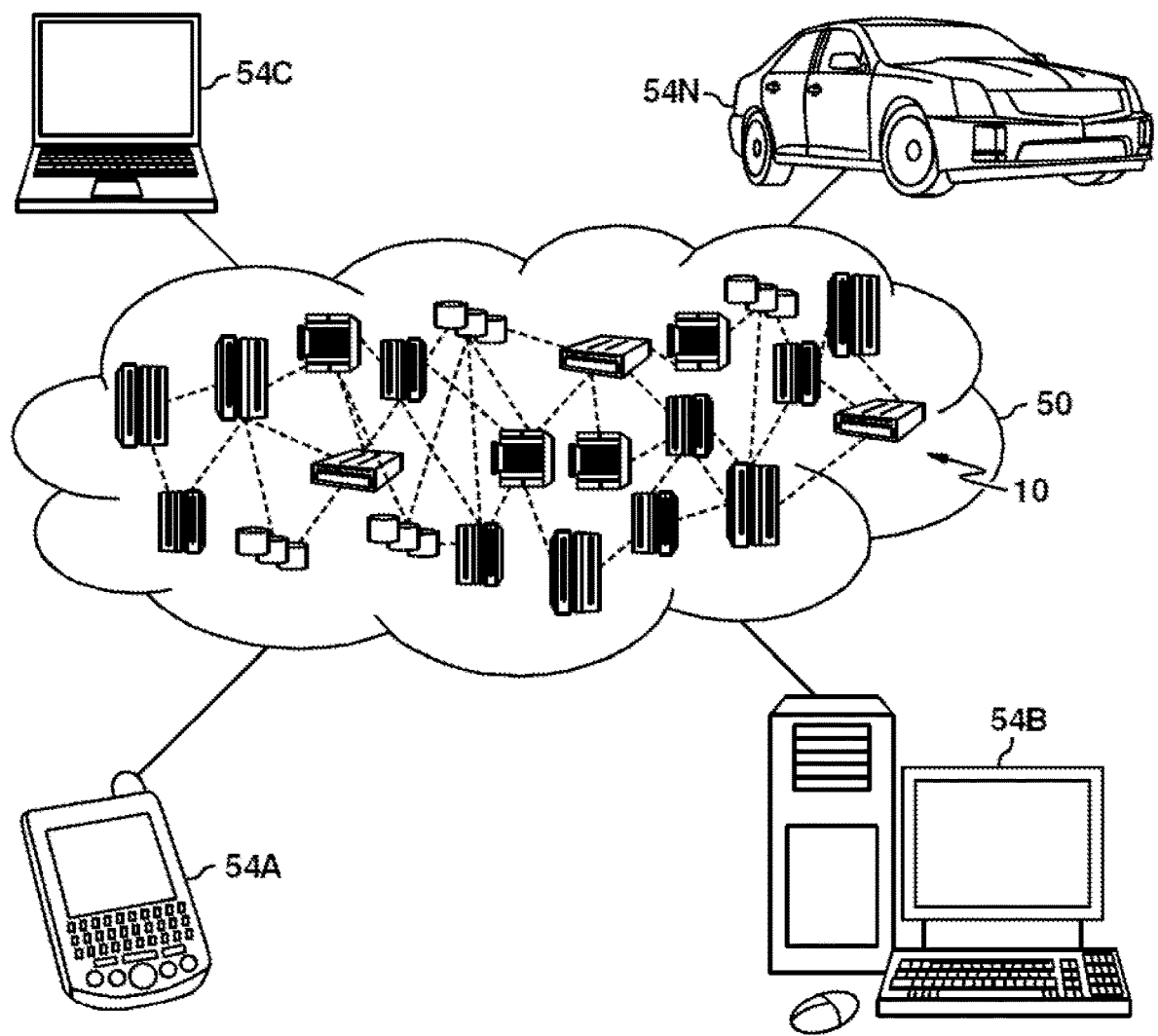
FIG. 1 depicts a cloud computing environment according to an embodiment of the present invention.

Embodiments of the present invention improve conventional database management systems (DBMSs) by providing a mechanism for avoiding deadlock conditions when two transactions attempt to concurrently access the same database resource, such as a data page that contains a certain row of a database table or an index leaf page that points to that row. This mechanism involves a method for securely accessing database resources without requiring the acquisition of a shared lock (S-lock) on the accessed resource.

Although multiple transactions may acquire concurrent S-locks on the same database data page or index leaf page, a database resource that has been exclusively locked (X-locked) cannot be S-locked or X-locked by another transaction until the first X-lock is released. If database data pages or index pages are implemented as linked lists, in which each page contains a pointer to an immediately following, adjacent page, an operation that locks a particular data page or index leaf page must also lock the page that immediately precedes or follows the locked page. This is required because an operation that deletes or inserts a record (or, in some cases, revises an existing record in such a way that the existing record is deleted and a replacement record inserted), can require an alteration of the pointers to the data page or index leaf page associated with that record.

It is possible for a deadlock to occur when one transaction, such as an SQL DELETE or INSERT operation, attempts to acquire an X-lock on a pair of adjacent database records or index leaf pages at the same time that a second transaction, such as an SQL SELECT operation, tries to S-lock the same two resources. If the two transactions each manage to lock one of the two resources, neither transaction can proceed until the other transaction releases its lock. This results in a deadlock condition, in which the resource page becomes unavailable until one of the two transactions relinquishes its locks.

The present invention provides an improved type of DBMS access mechanism that avoids such deadlock conditions by providing an alternate way for statements like an SQL SELECT to access database resources without S-locking those resources. This mechanism may be incorporated into existing DBMS implementations by adding several fields to the DBMS's database-index records and log-buffer records and by replacing existing S-lock logic with steps that traverse those additional fields in order to identify the most recently committed value of the desired record without S-locking the actual database data page or index leaf page.

These improvements provide benefits to existing DBMS technology by eliminating resource-consuming deadlock conditions. Such benefits include reduction of CPU idle time, increased availability of database resources, avoidance of the need to re-traverse an index after a deadlock is resolved, and greater flexibility in performing concurrent read and write operations.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
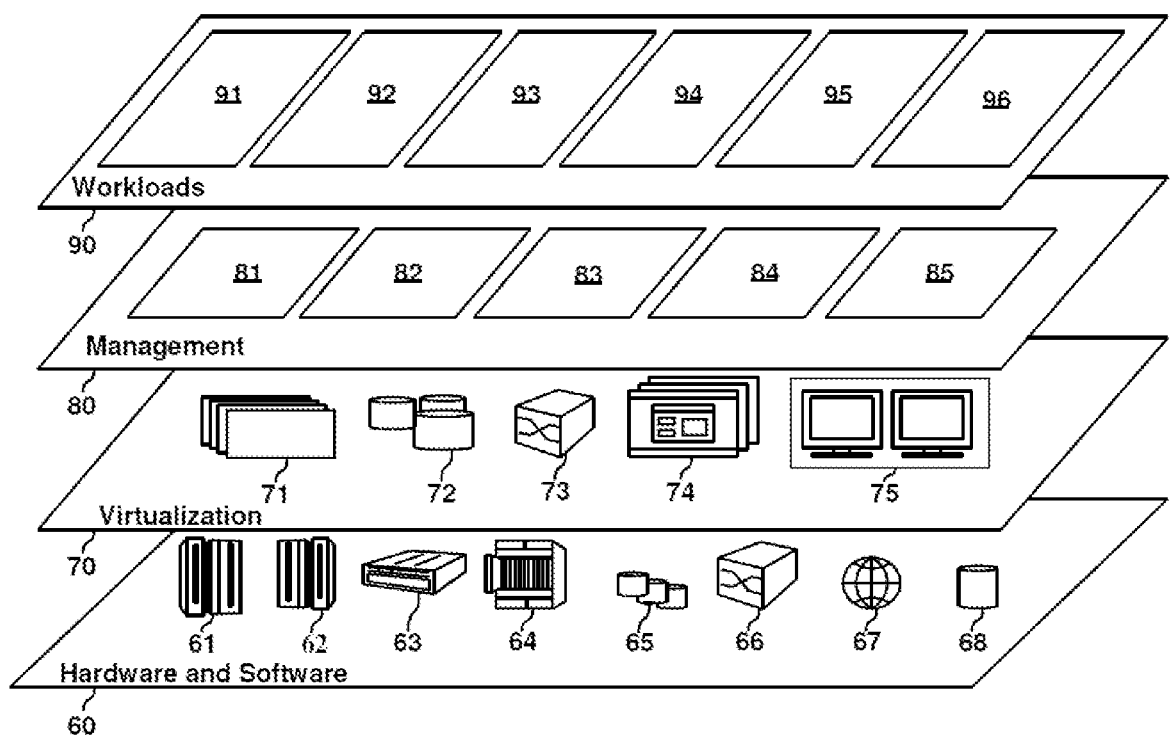
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and orchestration of complex database-management that prevents deadlock conditions by eliminating shared locking 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 3:
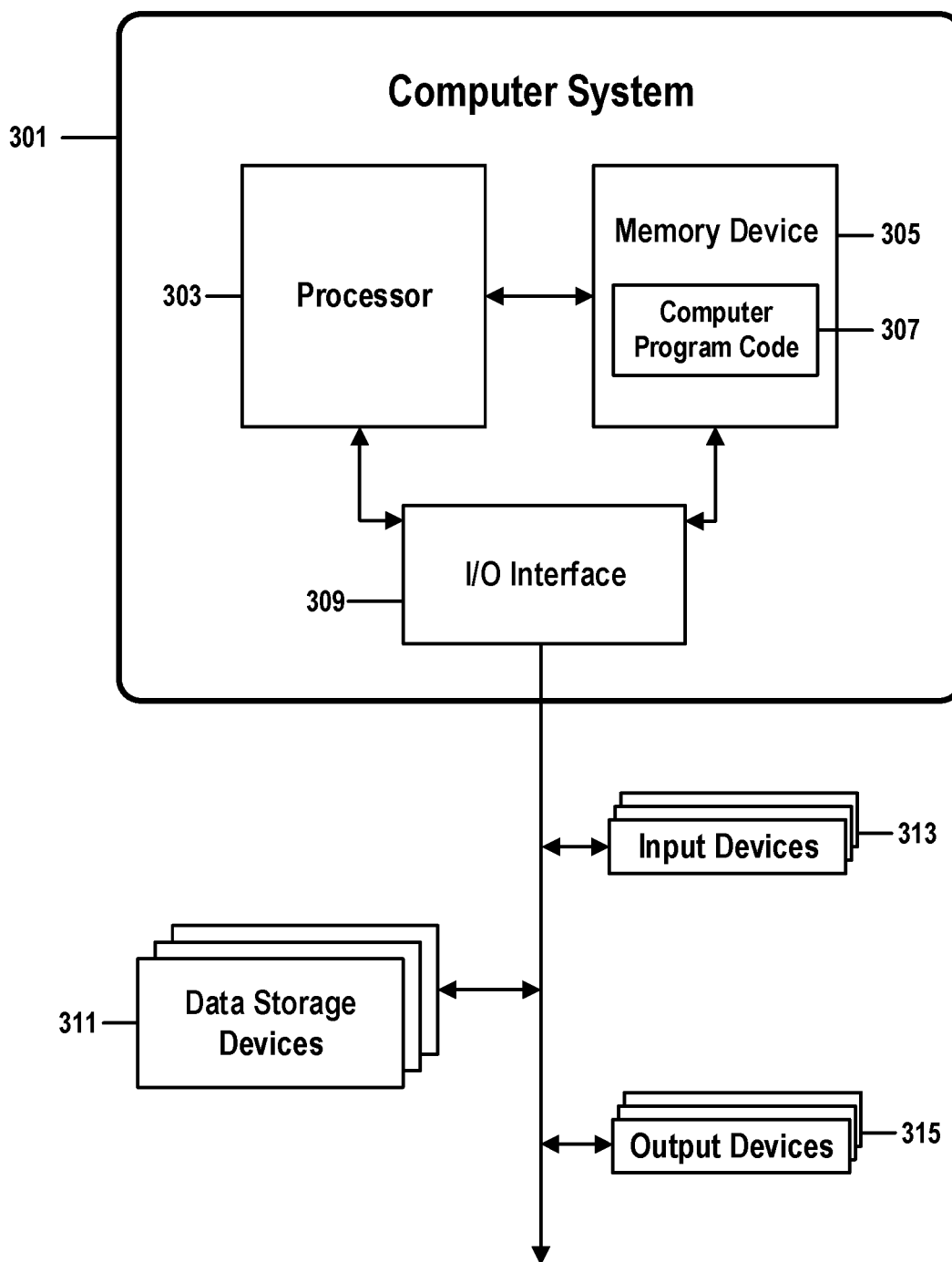
FIG. 3 shows the structure of a computer system and computer program code that may be used to implement a method for preventing DBMS deadlock by eliminating shared locking in accordance with embodiments of the present invention.

FIG. 3 shows a structure of a computer system and computer program code that may be used to implement a method for preventing DBMS deadlock by eliminating shared locking in accordance with embodiments of the present invention. FIG. 3 refers to objects 301-315.

In FIG. 3, computer system 301 comprises a processor 303 coupled through one or more I/O Interfaces 309 to one or more hardware data storage devices 311 and one or more I/O devices 313 and 315.

Hardware data storage devices 311 may include, but are not limited to, magnetic tape drives, fixed or removable hard disks, optical discs, storage-equipped mobile devices, and solid-state random-access or read-only storage devices. I/O devices may comprise, but are not limited to: input devices 313, such as keyboards, scanners, handheld telecommunications devices, touch-sensitive displays, tablets, biometric readers, joysticks, trackballs, or computer mice; and output devices 315, which may comprise, but are not limited to printers, plotters, tablets, mobile telephones, displays, or sound-producing devices. Data storage devices 311, input devices 313, and output devices 315 may be located either locally or at remote sites from which they are connected to I/O Interface 309 through a network interface.

Processor 303 may also be connected to one or more memory devices 305, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 305 contains stored computer program code 307, which is a computer program that comprises computer-executable instructions. The stored computer program code includes a program that implements a method for preventing DBMS deadlock by eliminating shared locking in accordance with embodiments of the present invention, and may implement other embodiments described in this specification, including the methods illustrated in FIGS. 1-8. The data storage devices 311 may store the computer program code 307. Computer program code 307 stored in the storage devices 311 is configured to be executed by processor 303 via the memory devices 305. Processor 303 executes the stored computer program code 307.

In some embodiments, rather than being stored and accessed from a hard drive, optical disc or other writeable, rewriteable, or removable hardware data-storage device 311, stored computer program code 307 may be stored on a static, nonremovable, read-only storage medium such as a Read-Only Memory (ROM) device 305, or may be accessed by processor 303 directly from such a static, nonremovable, read-only medium 305. Similarly, in some embodiments, stored computer program code 307 may be stored as computer-readable firmware, or may be accessed by processor 303 directly from such firmware, rather than from a more dynamic or removable hardware data-storage device 311, such as a hard drive or optical disc.

Thus the present invention discloses a process for supporting computer infrastructure, integrating, hosting, maintaining, and deploying computer-readable code into the computer system 301, wherein the code in combination with the computer system 301 is capable of performing a method for preventing DBMS deadlock by eliminating shared locking.

Any of the components of the present invention could be created, integrated, hosted, maintained, deployed, managed, serviced, supported, etc. by a service provider who offers to facilitate a method for preventing DBMS deadlock by eliminating shared locking. Thus the present invention discloses a process for deploying or integrating computing infrastructure, comprising integrating computer-readable code into the computer system 301, wherein the code in combination with the computer system 301 is capable of performing a method for preventing DBMS deadlock by eliminating shared locking.

One or more data storage devices 311 (or one or more additional memory devices not shown in FIG. 3) may be used as a computer-readable hardware storage device having a computer-readable program embodied therein and/or having other data stored therein, wherein the computer-readable program comprises stored computer program code 307. Generally, a computer program product (or, alternatively, an article of manufacture) of computer system 301 may comprise the computer-readable hardware storage device.

In embodiments that comprise components of a networked computing infrastructure, a cloud-computing environment, a client-server architecture, or other types of distributed platforms, functionality of the present invention may be implemented solely on a client or user device, may be implemented solely on a remote server or as a service of a cloud-computing platform, or may be split between local and remote components.

While it is understood that program code 307 for a method for preventing DBMS deadlock by eliminating shared locking may be deployed by manually loading the program code 307 directly into client, server, and proxy computers (not shown) by loading the program code 307 into a computer-readable storage medium (e.g., computer data storage device 311), program code 307 may also be automatically or semi-automatically deployed into computer system 301 by sending program code 307 to a central server (e.g., computer system 301) or to a group of central servers. Program code 307 may then be downloaded into client computers (not shown) that will execute program code 307.

Alternatively, program code 307 may be sent directly to the client computer via e-mail. Program code 307 may then either be detached to a directory on the client computer or loaded into a directory on the client computer by an e-mail option that selects a program that detaches program code 307 into the directory.

Another alternative is to send program code 307 directly to a directory on the client computer hard drive. If proxy servers are configured, the process selects the proxy server code, determines on which computers to place the proxy servers' code, transmits the proxy server code, and then installs the proxy server code on the proxy computer. Program code 307 is then transmitted to the proxy server and stored on the proxy server.

In one embodiment, program code 307 for a method for preventing DBMS deadlock by eliminating shared locking is integrated into a client, server and network environment by providing for program code 307 to coexist with software applications (not shown), operating systems (not shown) and network operating systems software (not shown) and then installing program code 307 on the clients and servers in the environment where program code 307 will function.

The first step of the aforementioned integration of code included in program code 307 is to identify any software on the clients and servers, including the network operating system (not shown), where program code 307 will be deployed that are required by program code 307 or that work in conjunction with program code 307. This identified software includes the network operating system, where the network operating system comprises software that enhances a basic operating system by adding networking features. Next, the software applications and version numbers are identified and compared to a list of software applications and correct version numbers that have been tested to work with program code 307. A software application that is missing or that does not match a correct version number is upgraded to the correct version.

A program instruction that passes parameters from program code 307 to a software application is checked to ensure that the instruction's parameter list matches a parameter list required by the program code 307. Conversely, a parameter passed by the software application to program code 307 is checked to ensure that the parameter matches a parameter required by program code 307. The client and server operating systems, including the network operating systems, are identified and compared to a list of operating systems, version numbers, and network software programs that have been tested to work with program code 307. An operating system, version number, or network software program that does not match an entry of the list of tested operating systems and version numbers is upgraded to the listed level on the client computers and upgraded to the listed level on the server computers.

After ensuring that the software, where program code 307 is to be deployed, is at a correct version level that has been tested to work with program code 307, the integration is completed by installing program code 307 on the clients and servers.

Embodiments of the present invention may be implemented as a method performed by a processor of a computer system, as a computer program product, as a computer system, or as a processor-performed process or service for supporting computer infrastructure.

Figure 4:
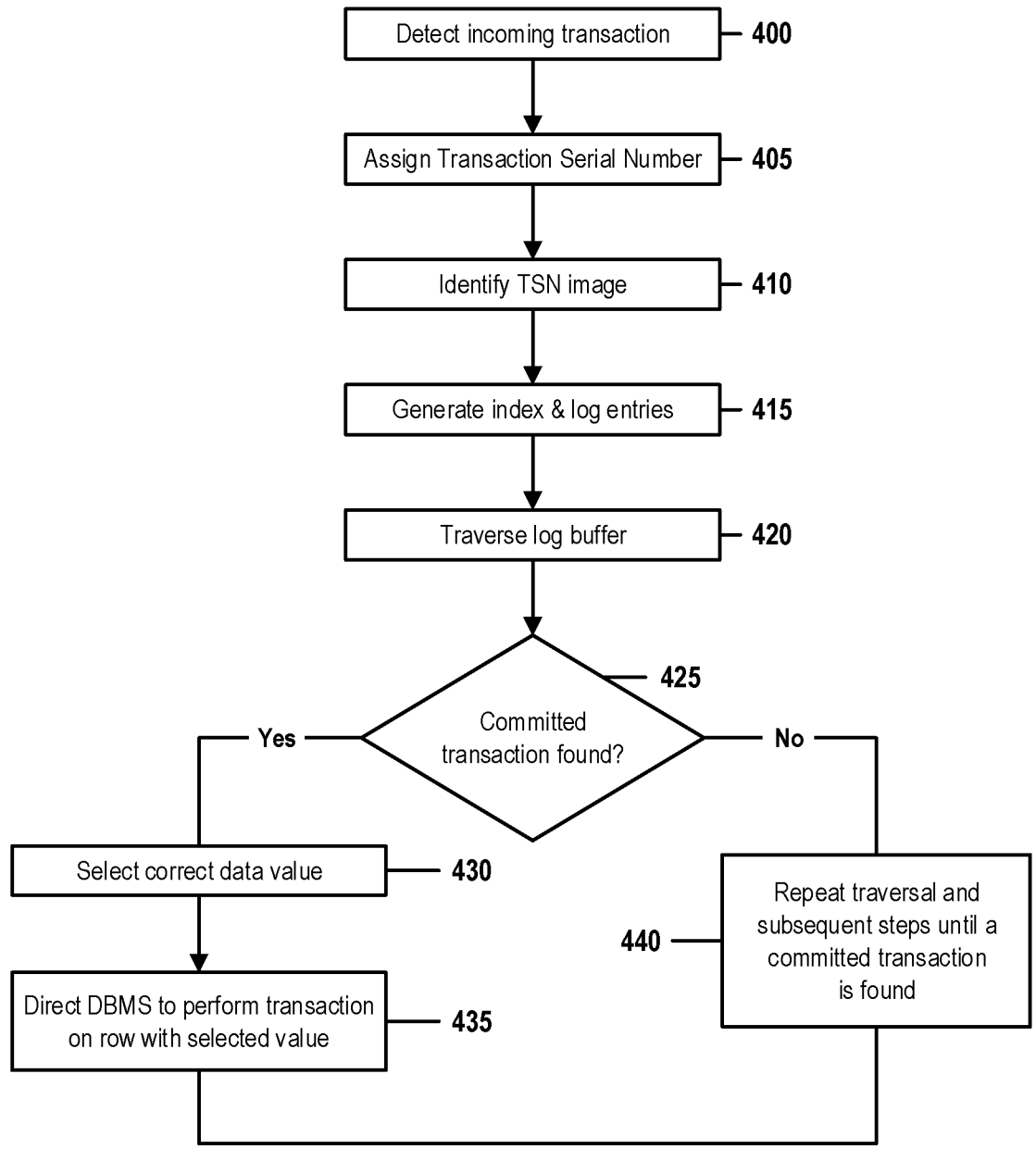
FIG. 4 is a flow chart that illustrates steps of a method for preventing DBMS deadlock by eliminating shared locking in accordance with embodiments of the present invention.

FIG. 4 is a flow chart that illustrates the steps of a method for preventing DBMS deadlock by eliminating shared locking in accordance with embodiments of the present invention. The method of FIG. 4 contains steps 400-440.

In step 400, the DBMS detects an incoming transaction. This transaction may be any sort of query or other data-access request that contains a command that is functionally equivalent to a Structured Query Language (SQL) SELECT statement and an SQL COMMIT statement. As is known in the art, an SQL SELECT statement, among other things, requests read access to a row of a database table, and an SQL COMMIT statement makes permanent all changes requested by previous statements.

For example, if an incoming query contains a block of SQL statements that includes a DELETE statement and is terminated by a COMMIT statement, the DBMS would execute the COMMIT statement by performing the requested deletion operation upon an actual table row or other record in the database. This operation would also include updating any pointers in the data pages that contain or that reference the data page that contained the deleted record. It would also include updating any pointers in the leaf index pages that reference the updated data page or pages.

A single incoming query or other data-access request may contain more than one set of statements that are each terminated by a distinct COMMIT statement. In such cases, each set of statements is considered a single transaction. Each of these transactions is then processed independently by a distinct iteration of the procedure of FIG. 4.

In step 405, the DBMS assigns a distinct Transaction Serial Number (TSN) to the transaction identified in step 400. In certain embodiments, the DBMS assigns TSNs in chronological order and a TSN is assigned to a particular transaction when the DBMS detects the presence of an SQL SELECT (or functionally equivalent) statement in an incoming data-access request.

In step 410, the DBMS generates and associates a TSN image with the transaction to which the TSN was assigned in step 406. A TSN image is a set of TSNs that identify transactions that have not yet been committed at the time that a current TSN was assigned in step 405. In some embodiments, this image is continuously updated by DBMS 500 through functionality that is well within the scope of functionality available to known DBMSs. That is, even a known DBMS could not function if it did not keep track of which requested database-access operations have been completely performed upon the contents of its database.

In certain embodiments, the DBMS, in this way, continuously adds TSNs to and deletes TSNs from the TSN image. A previously assigned TSN is deleted from the image when all database-access operations requested by the transaction identified by the previously assigned TSN have been committed. In some embodiments, a TSN is added to the TSN image when the improved DBMS assigns that TSN to a newly received transaction identified in a future iteration of steps 400-405. This procedure assumes that the DBMS is capable of performing multiple concurrent instances of the method of FIG. 4, where each instance processes one of what may be numerous transactions that are serviced concurrently by the DBMS.

Figure 5:
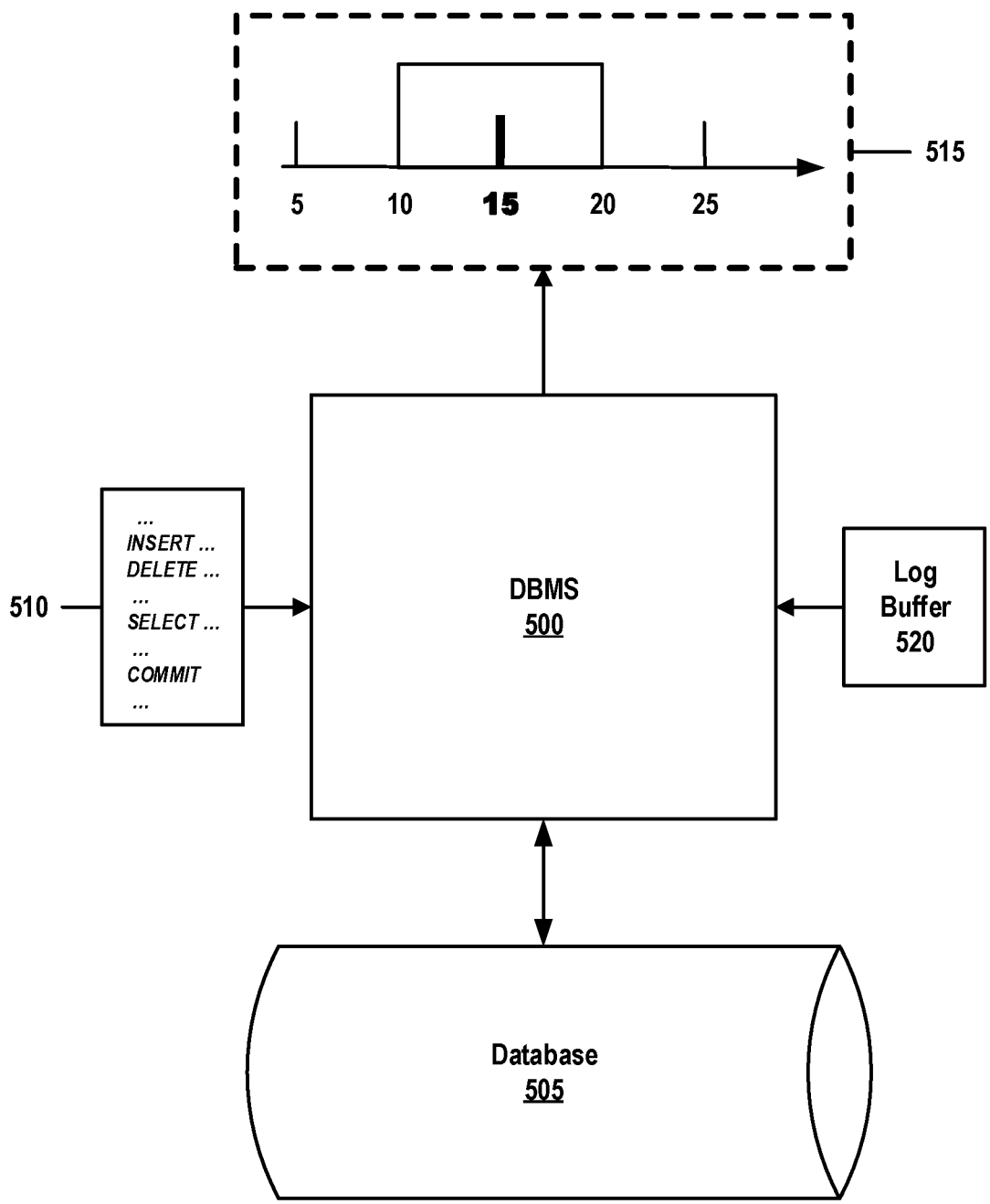
FIG. 5 shows a framework of a DBMS that creates a TSN image in response to receiving a request for database access in accordance with embodiments of the present invention.

FIG. 5 illustrates an exemplary framework of a DBMS that creates a TSN image in this manner. FIG. 5 shows items 500-520.

In the example of FIG. 5, the DBMS receives an SQL query containing statements that include a SELECT statement and one or more INSERT or DELETE statements that are followed by a COMMIT statement. The DBMS identifies the set of statement terminated by the COMMIT statement as a transaction, to which the DBMS assigns a TSN. In this example, the DBMS assigns a TSN value of 15 because the previous TSN most recently assigned by the DBMS to an incoming transaction had a value of 14.

The DBMS next determines which transactions have not yet been committed. This determination may be made by any means known in the art, since it is the DBMS itself that is responsible for servicing COMMIT statements contained in incoming data-access requests. The DBMS thus has intrinsic access to this information, which may be recorded, logged, or communicated to modules that implement embodiments of the present invention in any manner desired by an implementer.

In FIG. 5, DBMS 500 receives an incoming SQL query 510, which contains a set of SQL statements that request access to data stored in database 505 and is terminated by an SQL COMMIT statement. DBMS 500 identifies the set of statements as a transaction and assigns the next sequentially available TSN to this transaction. DBMS 500 also records details of each operation to be performed by any of these statements on the contents of database 505. These records are stored, using database-management mechanisms known in the art, in one or more log buffers 520, such as a redo buffer or an undo buffer.

In this example, DBMS 500 then builds a TSN image 515 that will be associated with TSN 15. At the time that the image 515 is built, DBMS 500 determines that 11 transactions, assigned TSNs 10-20, have not yet been committed. TSN image 515 thus enumerates the set of 11 TSNs that correspond to the currently uncommitted transactions.

Referring back to FIG. 4, in step 415, the DBMS updates an index page-leaf record and a log-buffer record that correspond to a database-access operation associated with the TSN assigned in step 405. Known DBMSs manage index values by means of records organized into an index tree, such as a B-tree or B+ tree data structure. Each leaf node of the index tree contains records that each identify a data value stored in a particular row of a particular database table. Known DBMSs may also maintain log buffers, such as an undo buffer or a redo buffer. Each record in one of these buffers records an operation performed on a value stored in a particular row of a particular table, such as an update to an index value, a row insertion triggered by the insertion of a new instance of an index value, or a row deletion operation triggered by the deletion of an existing instance of an index value.

In known DBMSs each of these leaf-page records and log-buffer records contains at least a row identifier that specifies a particular row of a particular table, and an index value that is stored in or deleted from that particular row a database-access operation. These two values are shown as the two leftmost fields in the database-record data-structure represented by item 600 in FIG. 6.

Figure 6:
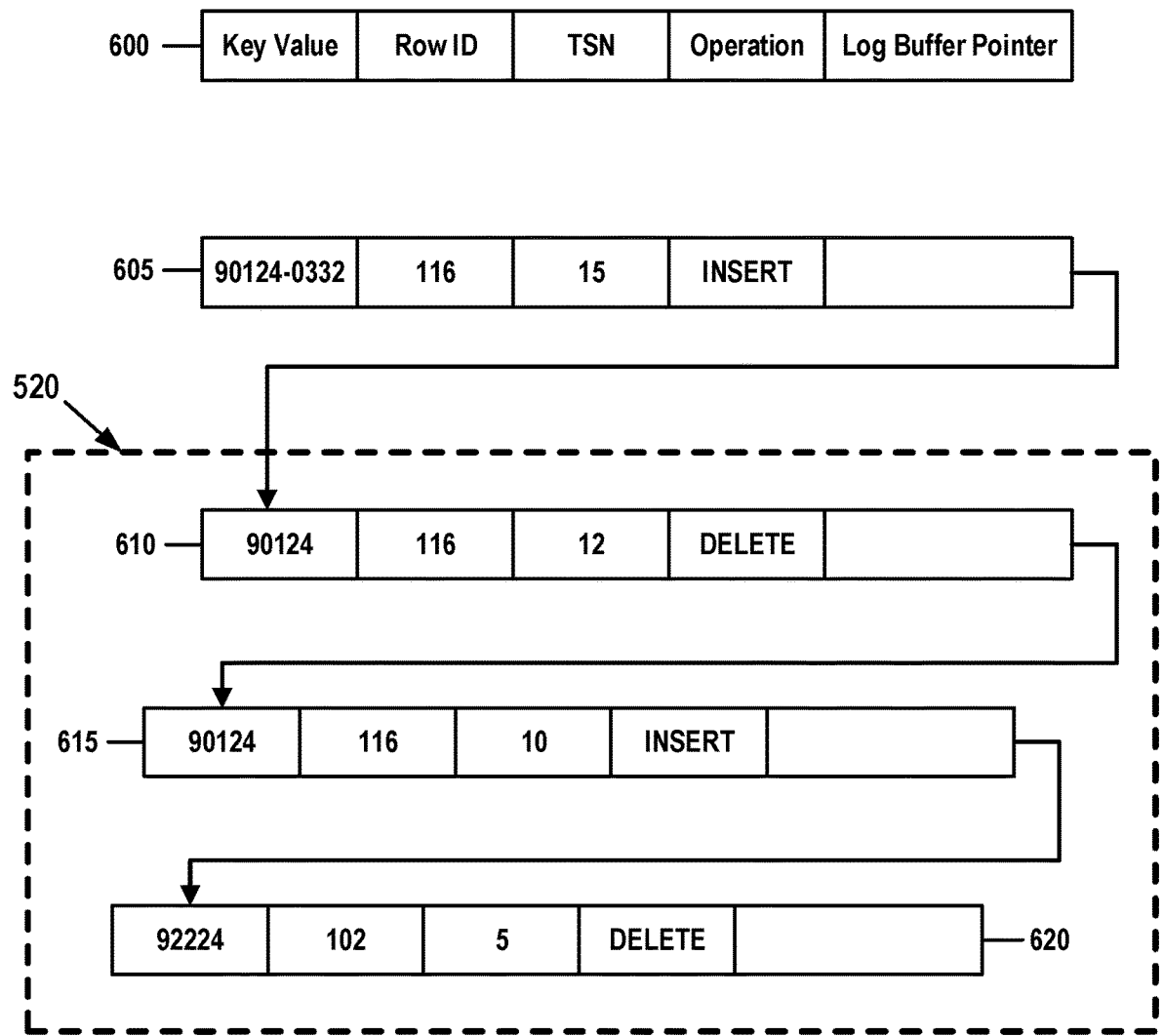
FIG. 6 shows data structures of an improved DBMS index leaf-page record and improved DBMS log-buffer records in accordance with embodiments of the present invention.

Embodiments of the present invention enhance the data structures of known index leaf-page records and log-buffer records by adding three fields to each record. FIG. 6 shows the resulting data structures of the improved DBMS index leaf-page records and improved DBMS log-buffer records, as provided by embodiments of the present invention. FIG. 6 shows items 520 and 600-620. Item 600 shows the improved data structure of index leaf-page records and log-buffer records used by embodiments of the present invention. Item 605 is an example of an improved index leaf-page record and items 610-620 show an example of a linked list, stored in improved log buffer 520, that provide a transaction history of the database row identified by corresponding index leaf-page record 605.

This transaction history, among other things, tracks changes made to the index value associated with the database row, as well as to predecessors of that row that may have been deleted by DELETE operations. Each linked list in the log buffer, such as items 610-620, provides a reverse-chronological history of values assumed by one instance of an index. Embodiments of the present invention, as will be explained below, add fields to each log-buffer record that tell the DBMS which of these operations have not already been committed—and thus have not already altered the previous index value.

The two leftmost fields of known data structure 600 are a "Row ID" field that identifies a row of a database table and a "Key Value" field that identifies a value of an index or key that can be used to locate that row in the database 505. As described above, this structure is incorporated into both index leaf pages that allow the DBMS to find a table row that contains a particular value, and into log-buffer records that record operations performed upon a particular row. Embodiments of the present invention add at least three other fields:

i) a "TSN" field that identifies the TSN of the transaction that requests a data-access operation performed upon the row identified by the Row ID field;

ii) an "Operation" field that identifies the data-access operation requested by the transaction identified by the TSN; and iii) a "Log Buffer Pointer" field that points to a next record in the linked-list 610-620 of log buffer 520 records. This next record identifies a next most-recently requested data-access operation to be performed on the row. The next-most recently requested data-access operation is generally requested by a transaction that chronologically precedes the transaction identified by the current record's TSN field. If the record represented by item 600 is a record of a leaf-page buffer (such as item 605), the Log Buffer Pointer field points to the first record of the linked list 610-620 (such as record 610 in the example of FIG. 6).

In subsequent steps of the method of FIG. 4, starting with step 420, the DBMS identifies a key value of the database row that the SELECT (or similar) statement of the transaction identified in step 400 attempts to read. Unlike procedures used by known DBMS systems, the improved method of FIG. 4 performs this operation without acquiring an S-lock on either the index leaf-page or the data page of database 500 being queried by the SELECT statement.

This improved procedure comprises:

i) identifying a database table and row that must be accessed by the SELECT statement (or another instruction that would normally require the acquisition of an S-lock on the identified row) of the transaction identified in step 400 and assigned the TSN in step 405. This step may require retrieving, through known means, an index leaf-page record (such as the exemplary record 605) that identifies the database table and row upon which a data-access operation is to be performed by the TSN-identified transaction. The row to be accessed is identified by the Row ID field of the retrieved leaf-page record and the value to be inserted, assigned, or deleted by the operation is identified by the Key Value field of the row. The retrieved record may also identify an operation to be performed on the row by a statement of the TSN-identified transaction. Such operations are generally of a type that requires acquisition of an exclusive lock (X-lock) on the row, such as operations performed by SQL statements that alter an index value, such as INSERT, DELETE, and UPDATE statements. Unlike known DBMS systems, the improved DBMS of the present invention does not need to acquire a shared lock (S-lock) on the identified table row.

ii) retrieving from log buffer 520 the first log-buffer record that identifies a previously requested operation to be performed on the identified row. This first retrieved record (represented by item 610 in the example of FIG. 6) identifies an operation that was requested by a second transaction, identified by the TSN field of the first retrieved record, upon the identified row. Examples of this procedure are discussed below.

iii) determining whether the operation identified by the first retrieved record has been committed. This determination is made by determining whether the TSN of the transaction identified by the first retrieved record is currently in the TSN image 515 created in step 405. In some embodiments, the TSN image may be updated by the improved DBMS immediately before performing this determination and in other embodiments, as discussed in the description of step 410, the improved DBMS continuously updates the TSN image to add newly assigned TSNs to the image and to delete from the image TSNs of transactions that have been committed. Certain embodiments may even omit some or all of the TSN-creation and TSN-maintenance steps, instead substituting a more streamlined procedure based on the DBMS's awareness of when specific requested data-access operations are committed. Such embodiments may not, however, operate with the robustness, efficiency, and temporal accuracy of the TSN-image-based mechanism described in FIGS. 4 and 5.

iv) determining the visibility of they key value specified by the first retrieved log-buffer record. If the TSN value specified by the first retrieved record identifies a committed transaction, then the key value specified by the first retrieved record is deemed to be visible to the transaction specified by the TSN of the index leaf-page entry.

If, however, the TSN value specified by the first retrieved record identifies a transaction that has not yet been committed, then the key value specified by the first retrieved record is deemed to be invisible to the transaction specified by the TSN of the index leaf-page entry. In this case, the DBMS uses the pointer identified by the log-buffer pointer field of the first retrieved record to retrieve a second log-buffer record, repeating steps ii-iv. Again, if the transaction identified by the TSN of the second retrieved record is still uncommitted, the DBMS continues this procedure by retrieving a third record pointed to by the log-buffer pointer field of the second record.

This procedure continues until either a log-buffer record is retrieved that identifies a committed transaction or until the linked list of records stored in the log buffer ends without identifying a committed transaction. In the former case, the DBMS identifies the key value specified by the first log-buffer record in the linked list (that is, the most recent committed transaction in the list) as the value that should be deemed visible to the transaction identified in step 400. In this manner, the DBMS identifies a key value of the database row without requiring a shared lock to be acquired on that row, and thus avoiding the possibility of a deadlock condition should another transaction be concurrently attempting to lock the same row.

In the case that all records in the log-buffer linked list identify transactions that have not yet been committed, the DBMS does not perform any further operations requested by the transaction identified in step 400. In some embodiments, a warning or error condition is reported to a user or an administrator, but in embodiments and examples of FIG. 4, the DBMS may pause for a specified amount of time, if desired by an implementer, and then repeat step 420 to determine if any transaction identified by a log-buffer record of the link list has been committed since the previous iteration of step 420.

The method of FIG. 4, as illustrated by the example of FIG. 6, shows one possible implementation of this procedure.

In step 420, DBMS 500 begins traversing the linked list of log-buffer records 610-620 that describe previously requested transactions to be performed upon the row identified by index leaf-page 605. In the example of FIG. 6, index leaf-page record 605 identifies an INSERT operation of the current transaction, which has been assigned TSN 15. This operation seeks to insert a 9-digit Zip Code key value of 90124-0332 into row 116 of the database table specified by the current transaction. Before committing his INSERT operation, the DBMS must service a SELECT operation contained in the transaction in order to identify a correct index leaf-page and database data page to be processed. Here, the log-buffer pointer field of record 605 points to a first record 610 of a linked list 610-620 of logged operations that are to be, or have already been, performed upon row 116.

In this example, the first record 610 identifies a DELETE operation requested by the transaction identified by TSN 12. If DBMS 500, referring to a TSN image 515 created in step 410 and subsequently updated by DBMS 500, determines that TSN image 515 no longer contains TSN 12, then DBMS 500 concludes that the DELETE operation of first record 610 has been committed. This determination will allow DBMS 500 in step 435 to service the SELECT statement of transaction 15 without acquiring an S-lock on the data page of database 500 that contains row 116.

If, however, DBMS 500 determines that the transaction identified by TSN 12 has not yet been committed, DBMS 500 continues traversing the linked list to second record 615. Record 615 identifies an operation, requested by the transaction assigned TSN 10, that inserts a new key value "90124" into row 610. If TSN 10 has been committed, DBMS 500 deems the result of TSN 10's INSERT operation to be visible. In this example, the TSN 15 would then proceed on the assumption that row 116 contains a key value of "90124." But if TSN 10 has not yet been committed—that is, if TSN 10 is still contained in TSN image 515—then this procedure repeats, using the log-buffer pointer value of second retrieved record 615, to retrieve the third log-buffer record 620 of the linked list.

Again, DBMS 500 determines whether the transaction (assigned TSN 5) of the third record 620 has been committed. If so, DBMS 500 determines that the most recent operation to be committed in the link list is a deletion of a key value "92224" from row 102 of the database table. Because row 102 would have been deleted, at least in this example, subsequent insertions are made to row 116, which became the first available row for key values starting with the string "90124."

If, on the other hand, DBMS 500 determines that the transaction assigned TSN 5 has not yet been committed then, because record 620 is the final record in the linked list, the traversal of step 420 ends without finding a committed transaction and the method of FIG. 4 continues with step 425.

In step 425, DBMS 500 determines whether a committed log-buffer record has been traversed. If so, the method of FIG. 4 continues with steps 430 and 435. But if no record of retrieved log-buffer records 610-620 identifies a committed transaction, then DBMS 500 concludes with step 440, which repeats the steps of FIG. 4 starting with step 420. The method of FIG. 4 continues to iterate in this manner until at least one retrieved log-buffer record corresponds to a TSN that is not identified by the TSN image 515—that is, a TSN that identifies a transaction that has been committed.

In step 430, DBMS 500 identifies the key value of the identified row that should be visible to the DBMS 500 when further processing the current transaction (corresponding to TSN 15). This is the key value (and operation) identified by the record, of retrieved records 610-620, that was most recently committed. This key value is the value that would have been retrieved by known, unimproved DBMSs that directly access, and S-lock, a corresponding index leaf page or database data page. Embodiments of the present invention do not directly access the data table stored in database 505, and thus do not require acquisition of an S-lock. Instead, the embodiments identify a correct key value in a manner that cannot create a deadlock condition.

In this example, if the first retrieved record 610 identifies a most recently committed transaction 12, DBMS 500 would determine that row 116 had contained the deleted key value "90124," and that transaction TSN 15 would be free to insert a new row 116 with a key value "90124-0332."

If the most recently committed transaction corresponds to TSN 10, identified by the second retrieved record 615, DBMS 500 would determine that row 116 contains the now-deleted key value "90124," and that transaction TSN 15 would insert a new key value "90124-0332." Depending on implementation details of DBMS 500, this new key value might be inserted into a new row of the database table, distinct from currently occupied row 116, but a corresponding index entry could be inserted into the same index leaf-page if there is room on that leaf-page for additional records.

If the most recently committed transaction corresponds to TSN 5, identified by the third retrieved record 620, DBMS 500 would determine that row 102 should be deemed to have contained the now-deleted key value "92124." Transaction TSN 15 would insert a new key value "90124-0332" into row 116 or, depending on implementation details of DBMS 500, into a replacement row 116.

In all examples, the exact operations by which DBMS 500 services the statements contained in transaction TSN 15 are implementation-dependent. The internal rules and functionality of DBMS 500 determine how DBMS 500 would service various types of INSERT, DELETE, UPDATE, and other statements and the manner in which DBMS 500 performs these operations is beyond the scope of the present invention.

In all cases, however, this manner of servicing is identical to the steps that would be taken by DBMS 500 should DBMS 500 read an index key value from a database row, through known S-lock-based mechanisms, that is identical to the visible key value identified by the method of FIG. 4, which is based on identifying the most recent committed transaction performed upon that row. Embodiments of the present invention are flexible enough to accommodate any sort of database functionality that controls how a DBMS performs an INSERT, DELETE, UPDATE, or other type of operation that normally requires an X-lock. For example, in the exemplary embodiments described by the figures, an UPDATE operation would most easily be performed as a DELETE operation followed by an INSERT operation. But in other embodiments, a DBMS into which improvements of the present invention have been incorporated, a key value may be implemented as a single operation.

In step 435, having identified a visible key value, DBMS 500 forwards that visible value to other modules of DBMS 500, or to downstream systems or applications, that perform further operations required to service the transaction identified in step 400. Again, these further operations should be identical to those that would be performed should DBMS 500 have identified the same key value through a conventional, S-lock-based, mechanism.

Some embodiments may incorporate several variations of these procedures in special cases. For example, if a retrieved log-buffer record identifies a DELETE operation, and if the TSN specified by that record has fallen below the lower boundary of the TSN image 515 (or is otherwise not contained within the TSN image 515), then the key value specified by that log-buffer record is deemed invisible. This occurs because the deletion operation of that record is deemed to have been committed, resulting in the deletion of the record's key value. DBMS 500 would then proceed as though the SELECT statement had found returned no records.

In another example, if DBMS 500 is implemented with functionality that can perform an "INSERT WITH ROW ID REPLACEMENT" operation, such an operation might be represented by two UNDO log-buffer records: one that inserts a new key value and one that deletes the previous value, both of which are performed upon the same row. In this case, DBMS 500 would have been programmed to recognize such a pattern of log records as representing a row-ID replacement operation and would know how to act accordingly.

Finally, in DBMS systems that maintain both UNDO and REDO log buffers, multiple transactions that perform UPDATE operations on a same row may result in multiple entries in each buffer if one of the operations is performed prior to the current transaction and one is not performed until after the current transaction. Although such cases can result in more complex traversals, especially when a traversal is performed while concurrent operations are independently proceeding towards being committed, rigorously following the basic procedure of FIG. 4 will produce consistent, deterministic results.

Figure 7A:
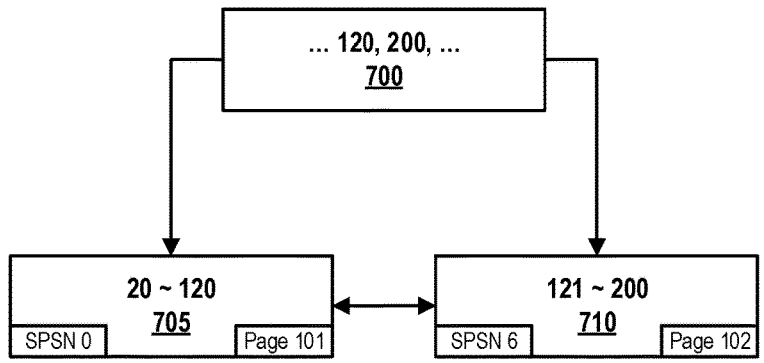
FIG. 7A and FIG. 7B illustrate an index-splitting operation performed by a DBMS in accordance with embodiments of the present invention.
Figure 7B:
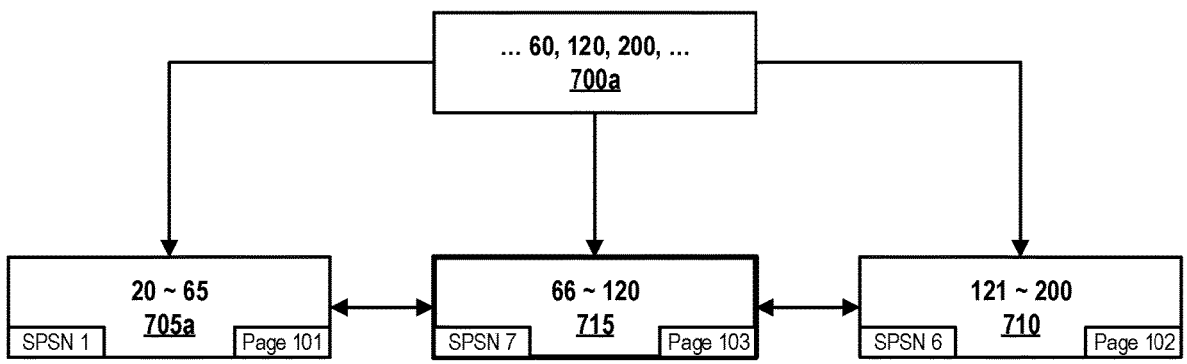

FIGS. 7A and 7B illustrate an index-splitting operation performed by a DBMS in accordance with embodiments of the present invention. FIG. 7A items 700, 705, and 710 show the state of a DBMS index tree prior to a performance of an index-split operation by the DBMS. FIG. 7B items 700*a*, 705*a*, 710, and 715 show the state of the index tree after the DBMS completes the split operation.

Figure 8:
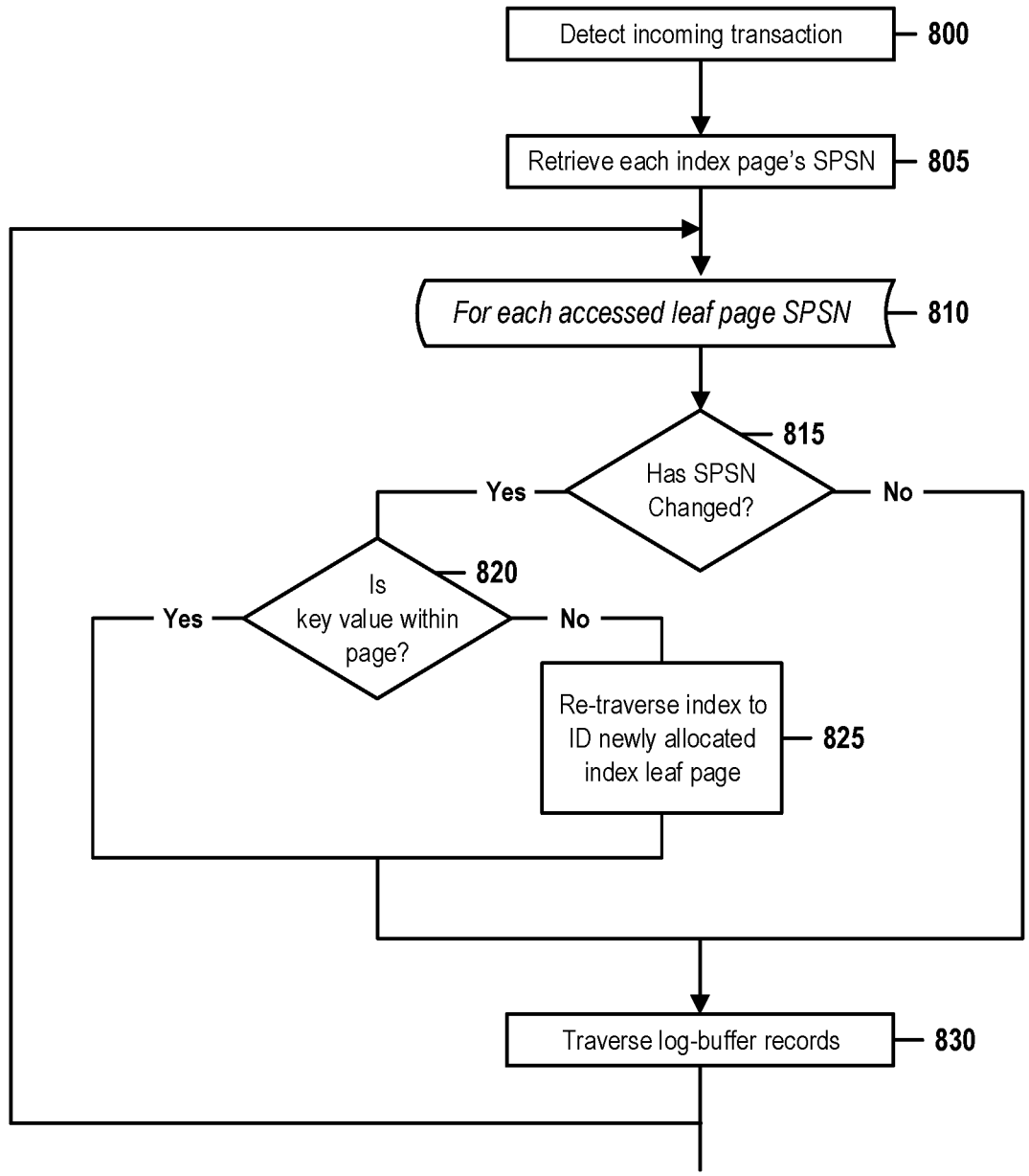
FIG. 8 is a flow chart that illustrates additional steps of a method of the present invention that accommodate DBMSs that split index leaf pages in accordance with embodiments of the present invention.

FIG. 8 is a flow chart that illustrates additional steps of a method of the present invention that accommodate DBMSs that split index leaf pages. FIG. 8 shows steps 800-830.

As explained above, embodiments of the present invention improve previous DBMS technologies by providing a way to access data stored in a row of a database table without the need to acquire an S-lock on either the database data pages that contain the accessed data or the index leaf pages that point to the data pages that contain the accessed data. Embodiments instead infer the state of the data to be accessed by traversing a linked list of log-buffer entries that record previously requested transactions on the pages in question, and by intelligently determining which of those transactions has already been committed.

This procedure may, however, produce an undesirable outcome if the DBMS splits one or more of the accessed index leaf pages between the time that the traversed log-buffer entries are generated and the time that an embodiment traverses the log-buffer. In such cases, the log buffer may no longer accurately represent the range of index values currently stored in each index-leaf page. The inferences generated by traversing a linked list of log-buffer entries might therefore not match the pointers and data values currently stored in the database.

This scenario is shown in FIGS. 7A and 7B. FIG. 7A shows a transaction in which an incoming query 700 requests access to database entries identified by key values 120 and 200. Index leaf Page 101 (item 705 in the figure) contains pointers to records of a database table that can be accessed by key values within the range 20 through 120. Index leaf Page 102 (item 710 in the figure), which immediately follows Page 101 (705), contains pointers to database records that can be accessed by key values within the range 121 through 200.

The DBMS would therefore attempt to access the record indexed by key value 120 by searching through leaf page 705 for a pointer to a record with a key value of 120 and would attempt to access the record indexed by key value 200 by searching through leaf page 710 for a pointer to a record with a key value of 120.

FIG. 7B shows a revised version of the leaf-page structure of FIG. 7A that exists after the DBMS performs an index split. In this example, the DBMS has split leaf page 705 into two pages, each of which has assumed a portion of the range of leaf values associated with original leaf page 705. Such a split may have been performed if, for example, an attempt has been made to store too many entries in leaf page 705.

The two split pages are shown in FIG. 7B as a revised Page 101, represented by item 705*a* in the figure, and a new Page 103, represented as item 715 in the figure. The two pages split the 20-120 range of values associated in original page 705 of FIG. 7A, with revised Page 101 (705*a*) storing pointers to records identified by key values within the range of 20-65 and new Page 103 (715) storing pointers to records identified by key values within the range of 66-120. Original Page 102 (item 710) is unchanged by the split.

In FIG. 7B, the DBMS receives a database query 700*a* that attempts to access database records identified by key values 60, 120, and 200. In this case, because the range of values associated with original leaf page 705 has now been split into two sub-ranges associated, respectively, with pages 705*a* and 715, the DBMS must access a different set of leaf pages in order to service this query. A pointer to a record identified by key value 60 would still be stored in the revised version of index leaf Page 101 (item 705*a*) and the pointer to the record identified by key value 200 is still stored in index leaf Page 102 (item 710). However, the DBMS must now retrieve the pointer to the record identified by value 120 from index leaf Page 103 (item 715). Prior to the split, as shown in FIG. 7A, the pointer to the record identified by value 120 was stored in index leaf Page 101 (item 705).

In a conventional database-access operation, the DBMS would acquire a share lock on index leaf pages that contained the three pointers in question. This conventional data-access operation, by traversing a path through the index tree down to the leaf pages, would determine that FIG. 7B's pages 101, 102, and 103 contain the three desired pointers. However, embodiments of the present invention do not need to perform such an index traversal, instead relying on a traversal of log-buffer records that each identify a prior database-access transaction. If one or more of those log-buffer records describes a transaction that was requested or performed prior to an index split, the embodiment will not be aware that the index-tree structure has been revised from the structure of FIG. 7A to the revised, post-split structure of FIG. 7B.

The method of FIG. 8 illustrates an optional mechanism that allows embodiments of the present invention to determine when an index split has been performed on index leaf pages associated with a current transaction. An analogous procedure may be used to identify when a DBMS has performed a split on data pages that contain values to be accessed by a current transaction.

This optional mechanism comprises steps by which an additional field is added to each index leaf page or data page. This additional field contains a Split Page Sequential Number (SPSN) value that identifies how many times the page has been split.

Implementers may select any desired method of coding this information. For example, a page's SPSN may be as simple as a numeric counter that identifies the number of times that the page has been split. In other example, a page's SPSN may contain a set of alphanumeric values that combine a record of the number of times that the page has been split during a particular period of time with a specification of the starting time or duration of the period of time. The present invention is flexible enough to accommodate any sort of coding desired by an implementer.

In the example of FIGS. 7A and 7B, Page 101 (705) is initially assigned an SPSN of 0. In some embodiments, this might indicate that the page has not been split and in other embodiments, this value would indicate that the page has not been split during a particular period of time. In yet other embodiments, this value might indicate that the page has been split once, twice, or even ten times. Similarly, Page 102 (710) has an SPSN of 6.

In both cases, the precise value chosen of the SPSN chosen to represent a particular state of a page is not important. Nor is the exact number of times that the page has previously been split. What is important is whether the SPSN changes value during the course of accessing the database by performing the method of FIG. 4. In the example of FIG. 7B, the SPSN of Page 101 has changed from its initial value, shown in item 705, to its revised value shown in item 705a. This changed value indicates that Page 101 (705) was split at some time after transactions were performed on the index structure of FIG. 7A. The SPSN of Page 102 (710), however, has not changed, indicating that Page 102 (710) did not undergo a split during that time and still contains pointers to the same range of key values 121-200.

Although embodiments of the present invention do not directly access stored pages through conventional database-access mechanisms, and thus cannot determine through known means that an index page has been split at some time after a transaction was performed on that page and recorded into the log buffer, such embodiments can still determine that an index leaf page has been split by comparing current and past values of that page's SPSN value. Steps of this mechanism are described in FIG. 8, which refers back to the structures of FIGS. 7A and 7B.

In step 800, DBMS 500 detects an incoming database-access request and, in response, performs operations similar to those of FIG. 4, steps 400-410. These steps include extracting a "transaction" from the incoming request, assigning a TSN to that transaction, and generating a TSN image of transactions that have not yet been committed.

In step 805, DBMS 500 identifies current SPSNs of each leaf index page that is associated with key values of data pages to be accessed by the current transaction. This identification may be performed by any means known in the art. In one example, as described above, an SPSN field may be added to each leaf page record, or a single record or field, associated with each leaf page, could identify the current SPSN value associated with that page.

Step 810 begins an iterative procedure of steps 810-830, which is performed once for each index SPSN identified in step 805 or, in some embodiments, each index leaf page or data page that is to be accessed by the current transaction. In some embodiments, steps 810-830 are performed once for every log-buffer record that specifies a past transaction that sought to access a particular index leaf page or data page. In all cases, the iterative procedure is performed once for each page that must be accessed when servicing the current transaction.

In step 815, the system determines whether the SPSN of the page currently being accessed has changed from the SPSN's previous value. A duration of time during which this comparison is made may be selected as a function of implementation details deemed important by an implementer. For example, if processing a certain log-buffer record while traversing the log buffer (as described in FIG. 4), an implementer might compare the current SPSN value of the page accessed by the log-buffer record's TSN to the value of that SPSN at the time that the TSN was committed. In other cases, DBMS 500 might compare the current SPSN of a particular page to an earlier SPSN value stored in a log-buffer record that identifies a TSN that accesses that page. In this case, an implementer might choose to either store the earlier SPSN value at the time that the TSN was originally assigned to its transaction or at the time that the transaction was committed.

In all cases, regardless of the method by which an implementer chooses to determine whether an SPSN has changed, the determination of a change indicates that the index page identified by the original SPSN has been split. In such cases, DBMS 500 performs steps 820 and 825. In either case, the current iteration of the iterative procedure of step 810-830 then concludes with step 830.

For example, if DBMS 500 in the current iteration of steps 810-830 seeks to access a database record identified by key value 200, DBMS 500 would determine that index Page 102 (710), which had previously been associated with a range of key values that included value 200, has not been split. DBMS 500 makes this determination by determining that the SPSN value of Page 102 (710) has not changed from its previous value of 6. In this case, the method of FIG. 8 continues with step 830.

But if DBMS 500 seeks to access a database record identified by key value 60, DBMS 500 determines that index Page 101 (705a), which had previously been associated with a range of key values that included value 60, has been split. This determination is made by determining that the SPSN of Page 101 (705) has changed value. DBMS 500 then performs steps 820-830.

In step 820, DBMS 500, after determining that the currently accessed page has undergone a split operation, determines whether the key index value to be accessed still falls within the range of index values associated with the revised, split version of the page. If so, DBMS 500 continues with subsequent steps of the method of FIG. 4, including step 830. If the key index value does not fall within the range associated with the current page, DBMS 500 performs step 825 before continuing with step 830.

For example, in FIG. 7B, DBMS 500, after determining that Page 101 (705) has been split (because the value of that page's SPSN has changed from 0 to 1), determines whether key value 60 still falls within the range associated with the revised Page 101 (705a). In this example, because key value 60 falls within the range 20-65 of revised Page 101 (705a), DBMS 500 skips step 825 and continues with step 830 and subsequent steps previously described in FIG. 4.

However, if DBMS 500 in this step seeks to access a database record identified by key value 66, DBMS 500 performs step 825 before continuing to step 830 because key value 120 does not fall within the range 20-65 of revised Page 101 (705a).

Step 825 is performed when DBMS has determined that a key value to be accessed would have formerly fallen into the range of an index leaf page that has been split during the time since a previous transaction attempted to access the key value; and that the key value no longer falls into the revised range associated with the page after the page was split.

In this step, DBMS 500 traverses the entire index tree structure in order to identify the split index leaf page or pages that are now associated with the desired key values. This index traversal may be made by any means known in the art.

In the example of FIG. 7B, such a traversal would reveal that key value 120 is now associated with index leaf Page 103 (715), which was created when original Page 101 (705) was split into revised Page 101 (705a) and new Page 103.

DBMS 500 then updates its internal records, log-buffer records, index entries, or other stored data to record the fact that a subset of the key values associated with the pre-split version of Page 101 (705) are now associated with new Page 103 (715).

If, during the index traversal, it is determined that additional splits have been performed, the iterative procedure of steps 810-830 are repeated in order to account for those additional splits in a manner similar to that described above. For example, if original Page 101 (705) has been split three times, generating revised Page 101 (705a), Page 103 (715), and two other pages not shown in FIG. 7B, then certain embodiments could traverse the index multiple times in order to identify the range of values associated with each table split from original Page 101 (705).

Step 830 returns control to subsequent steps of the method of FIG. 4. This includes steps of traversing log-buffer records to identify committed transactions. In this case, however, if step 825 has been performed, DBMS 500 performs the traversal with the awareness that certain of the index leaf pages referenced by TSNs identified by certain log-buffer records should be mapped onto newly split index pages in order to locate the most current key-value pointers in the index tree.

Examples and embodiments of the present invention described in this document have been presented for illustrative purposes. They should not be construed to be exhaustive nor to limit embodiments of the present invention to the examples and embodiments described here. Many other modifications and variations of the present invention that do not depart from the scope and spirit of these examples and embodiments will be apparent to those possessed of ordinary skill in the art. The terminology used in this document was chosen to best explain the principles underlying these examples and embodiments, in order to illustrate practical applications and technical improvements of the present invention over known technologies and products, and to enable readers of ordinary skill in the art to better understand the examples and embodiments disclosed here.

What is claimed is:

1. A database-management system (DBMS) comprising a processor, a memory coupled to the processor, and a computer-readable hardware storage device coupled to the processor, the storage device containing program code configured to be run by the processor via the memory to implement a method for preventing DBMS deadlock by eliminating shared locking, the method comprising:

assigning a first transaction serial number (TSN) to a first transaction of a received data-access request,
where the first transaction is a contiguous subset of statements of the received data-access request,
where a statement of the subset requests read-only access of a first row of data of a database,
where the first row is stored in a first data page of the database, and
where a first leaf page of an index tree of the DBMS points to the first row;

creating a TSN image that identifies all TSNs previously assigned by the DBMS to received transactions that have not yet been committed;

traversing a linked list of log records,
where each record of the linked list identifies a TSN of a corresponding transaction and a write operation requested by the corresponding transaction, and
where the write operation requires write-access to the first row;

selecting, as a result of the traversing, a most recently committed write operation performed on the first row; and performing, as a function of the selecting, operations requested by the contiguous subset.

2. The DBMS of claim 1,
where the statement of the subset that requests read-only access is a Structured Query Language (SQL) SELECT statement that identifies the first row, and
where a final statement of the contiguous subset of statements is an SQL COMMIT statement.

3. The DBMS of claim 1,
where the write operation is selected from the group consisting of a row-insertion operation, a row-deletion operation, and a key-value update operation.

4. The DBMS of claim 1,
where each record of the linked list contains:
a first field that identifies a TSN of a logged transaction received by the DBMS,
a second field that identifies a type of write operation requested by the logged transaction,
a third field that identifies a row of the database upon which the logged transaction performs the write operation identified by the second field, and
a fourth field that points to a next record, if any, in the linked list.

5. The DBMS of claim 4, where the traversing further comprises:
reading a first log record, where the first log record is a most recently created record of the linked list;
determining whether a first logged TSN identified by the first field of the first log record identifies a committed transaction;
if determining that the transaction identified by the first logged TSN has been committed, selecting the operation identified by the second field of the first log record to be the most recently committed write operation; and
if determining that the transaction identified by the first logged TSN has not been committed, retrieving a next log record pointed to by the fourth field and repeating the reading, determining, and choosing until reading a log record that identifies a committed transaction.

6. The DBMS of claim 4, where the DBMS acquires no shared locks on any data page of the database or on any leaf page of the index during the assigning, the creating, the traversing, and the selecting.

7. The DBMS of claim 1, further comprising:
assigning an initial Split Page Sequential Number (SPSN) to the first leaf page prior to receiving the received data-access request;
updating the SPSN to a value that has not been previously assigned to the SPSN every time the first leaf page is split by the DBMS;
determining, at the outset of the traversing, whether a current value of the SPSN matches the initial value of the SPSN; and
if determining that the current value of the SPSN no longer matches the initial value, traversing the index tree to identify a split leaf page that contains a pointer to a key value of the first data row specified by the first transaction.

8. The DBMS of claim 1, where the linked list is a linked list of records stored in an undo log of the DBMS.

9. The DBMS of claim 1, where the linked list is a linked list of records stored in a redo log of the DBMS.

10. A method for preventing database-management system (DBMS) deadlock by eliminating shared locking, the method comprising:
assigning, by a processor of a DBMS, a first transaction serial number (TSN) to a first transaction of a received data-access request,
where the first transaction is a contiguous subset of statements of the received data-access request,
where a statement of the subset requests read-only access of a first row of data of a database,
where the first row is stored in a first data page of the database, and
where a first leaf page of an index tree of the DBMS points to the first row;
creating, by the processor, a TSN image that identifies all TSNs previously assigned by the DBMS to received transactions that have not yet been committed;
traversing, by the processor, a linked list of log records,
where each record of the linked list identifies a TSN of a corresponding transaction and a write operation requested by the corresponding transaction, and
where the write operation requires write-access to the first row;
selecting as a result of the traversing, by the processor, a most recently committed write operation performed on the first row; and
performing, as a function of the selecting, operations requested by the contiguous subset.

11. The method of claim 10,
where each record of the linked list contains:
a first field that identifies a TSN of a logged transaction received by the DBMS,
a second field that identifies a type of write operation requested by the logged transaction,
a third field that identifies a row of the database upon which the logged transaction performs the write operation identified by the second field, and
a fourth field that points to a next record, if any, in the linked list.

12. The method of claim 11, where the traversing further comprises:
reading a first log record, where the first log record is a most recently created record of the linked list;
determining whether a first logged TSN identified by the first field of the first log record identifies a committed transaction;
if determining that the transaction identified by the first logged TSN has been committed, selecting the operation identified by the second field of the first log record to be the most recently committed write operation; and
if determining that the transaction identified by the first logged TSN has not been committed, retrieving a next log record pointed to by the fourth field and repeating the reading, determining, and choosing until reading a log record that identifies a committed transaction.

13. The method of claim 10, where the DBMS acquires no shared locks on any data page of the database or on any leaf page of the index during the assigning, the creating, the traversing, and the selecting.

14. The method of claim 10, further comprising:
assigning an initial Split Page Sequential Number (SPSN) to the first leaf page prior to receiving the received data-access request;
updating the SPSN to a value that has not been previously assigned to the SPSN every time the first leaf page is split by the DBMS;
determining, at the outset of the traversing, whether a current value of the SPSN matches the initial value of the SPSN; and
if determining that the current value of the SPSN no longer matches the initial value, traversing the index tree to identify a split leaf page that contains a pointer to a key value of the first data row specified by the first transaction.

15. The method of claim 10, further comprising providing at least one support service for at least one of creating, integrating, hosting, maintaining, and deploying computer-readable program code in the computer system, wherein the computer-readable program code in combination with the computer system is configured to implement the assigning, the creating, the traversing, the selecting, and the performing.

16. A computer program product for a database-management system (DBMS), the computer program product comprising a non-transitory computer readable storage medium having program instructions embodied therewith, the program instructions executable by a processor to cause the processor to perform a method for preventing DBMS deadlock by eliminating shared locking, the method comprising:
assigning a first transaction serial number (TSN) to a first transaction of a received data-access request,
where the first transaction is a contiguous subset of statements of the received data-access request,
where a statement of the subset requests read-only access of a first row of data of a database,
where the first row is stored in a first data page of the database, and
where a first leaf page of an index tree of the DBMS points to the first row;
creating a TSN image that identifies all TSNs previously assigned by the DBMS to received transactions that have not yet been committed;
traversing a linked list of log records,
where each record of the linked list identifies a TSN of a corresponding transaction and a write operation requested by the corresponding transaction, and
where the write operation requires write-access to the first row;
selecting, as a result of the traversing, a most recently committed write operation performed on the first row; and
performing, as a function of the selecting, operations requested by the contiguous subset.

17. The computer program product of claim 16,
where each record of the linked list contains:
- a first field that identifies a TSN of a logged transaction received by the DBMS,
- a second field that identifies a type of write operation requested by the logged transaction,
- a third field that identifies a row of the database upon which the logged transaction performs the write operation identified by the second field, and
- a fourth field that points to a next record, if any, in the linked list.

18. The computer program product of claim 17, where the traversing further comprises:
- reading a first log record, where the first log record is a most recently created record of the linked list;
- determining whether a first logged TSN identified by the first field of the first log record identifies a committed transaction;
- if determining that the transaction identified by the first logged TSN has been committed, selecting the operation identified by the second field of the first log record to be the most recently committed write operation; and
- if determining that the transaction identified by the first logged TSN has not been committed, retrieving a next log record pointed to by the fourth field and repeating the reading, determining, and choosing until reading a log record that identifies a committed transaction.

19. The computer program product of claim 16, where the DBMS acquires no shared locks on any data page of the database or on any leaf page of the index during the assigning, the creating, the traversing, and the selecting.

20. The computer program product of claim 16, further comprising:
- assigning an initial Split Page Sequential Number (SPSN) to the first leaf page prior to receiving the received data-access request;
- updating the SPSN to a value that has not been previously assigned to the SPSN every time the first leaf page is split by the DBMS;
- determining, at the outset of the traversing, whether a current value of the SPSN matches the initial value of the SPSN; and
- if determining that the current value of the SPSN no longer matches the initial value, traversing the index tree to identify a split leaf page that contains a pointer to a key value of the first data row specified by the first transaction.

* * * * *